US005635918A

United States Patent [19]
Tett

[11] Patent Number: 5,635,918
[45] Date of Patent: Jun. 3, 1997

[54] METHOD AND APPARATUS FOR CONTROLLING MESSAGE DELIVERY TO WIRELESS RECEIVER DEVICES

[75] Inventor: Richard J. Tett, Plano, Tex.

[73] Assignee: Motorola, Inc., Schaumburg, Ill.

[21] Appl. No.: 405,527

[22] Filed: Mar. 16, 1995

[51] Int. Cl.$^6$ .................. H04Q 7/10; G08B 5/22
[52] U.S. Cl. .................. 340/825.52; 340/825.44; 340/825.47; 340/311.1; 455/54.1
[58] Field of Search .................. 340/825.44, 825.47, 340/825.52, 825.69, 311.1; 379/63, 56, 57; 455/186.1, 57.1; 364/419.01–419.09, 419.1–419.17

[56] References Cited

U.S. PATENT DOCUMENTS

| | | | |
|---|---|---|---|
| 4,263,480 | 4/1981 | Levine | 379/57 |
| 4,336,524 | 6/1982 | Levine | 340/311.1 |
| 4,713,808 | 12/1987 | Gaskill et al. | 340/825.44 X |
| 5,072,444 | 12/1991 | Breeden et al. | 340/825.44 X |
| 5,257,307 | 10/1993 | Ise | 340/825.44 X |
| 5,258,739 | 11/1993 | Deluca et al. | 340/825.44 |
| 5,475,586 | 12/1995 | Sata et al. | 364/419.02 |
| 5,487,100 | 1/1996 | Kane | 379/57 |
| 5,497,319 | 3/1996 | Chong et al. | 364/419.02 |
| 5,561,702 | 10/1996 | Lipp et al. | 340/825.44 X |

FOREIGN PATENT DOCUMENTS 57-27367A  2/1982  Japan .................. 364/419.02

Primary Examiner—Brian Zimmerman
Assistant Examiner—William H. Wilson, Jr.
Attorney, Agent, or Firm—Pablo Meles

[57] ABSTRACT

A method and apparatus for controlling message delivery to wireless receiver devices can be used for example to condense textual messages intended for a wireless receiver device by abbreviating various words in the message. Thus, a first message addressed to a wireless receiver device (20) is received and stored in a storage medium (14). The received message is then translated into a second message using a pre-defined dictionary associated with the wireless receiver device. The second message is then sent to the wireless receiver device. Thus, the wireless receiver device receives shorter messages conveying the same information as the original message that was to be sent to the wireless receiver device. The translating feature can also be used to code messages or translate messages into a different language.

15 Claims, 3 Drawing Sheets

METHOD AND APPARATUS FOR CONTROLLING MESSAGE DELIVERY TO WIRELESS RECEIVER DEVICES

TECHNICAL FIELD OF THE INVENTION

This invention relates generally to communications systems and more specifically to a method and apparatus for translating messages sent to wireless receiver devices.

BACKGROUND OF THE INVENTION

Wireless receiver devices, such as pagers, are becoming an increasingly popular communication device. Some wireless receiver devices are now capable of receiving textual messages that can be viewed on a display on the pager. A message may consist of letters, numbers, and or any typographic symbol supported by the wireless receiver device. One common character set used for communication with wireless receiver devices is the well-known ASCII character set.

Existing wireless receiver devices can only display a small number of characters at any one time. In addition, most wireless receiver devices have limited memory capacity and cannot store large messages. Even where a wireless receiver device has a significant memory, the size of that memory will necessarily limit the total number of messages that can be stored at any one time. In addition, charges for sending and receiving messages are often based on the number of characters in the message.

Due to the limited memory available on existing wireless receiver devices, people who send textual messages to wireless receiver devices often use abbreviations in an attempt to transmit the maximum amount of information with a minimum number of alphanumeric characters or symbols. Unfortunately, the user of the wireless receiver device may not be able to comprehend the meaning of the abbreviation that was intended by the sender. Different people abbreviate different words in different ways. Some message senders may be unaware of the limited memory capacity of the wireless receiver device. It would be desirable if senders of messages to wireless receiver devices did not have to worry about the length of their message or how to abbreviate that message.

Accordingly, a need has arisen for a method and apparatus to translate a message intended for a wireless receiver device so as to condense the message and allow more information to be communicated to the user of the wireless receiver device with less characters.

SUMMARY OF THE INVENTION

In accordance with the teachings of the present invention, a communications system is provided that substantially eliminates or reduces problems and disadvantages associated with prior systems.

According to one embodiment of the present invention, a system is provided that receives textual messages intended for a wireless receiver device. The received message is translated into a second message using a predefined dictionary associated with the wireless receiver device to which the message is to be sent. After translation, the message is then sent to the wireless receiver device. According to one embodiment of the invention, the user is allowed to disable the translating feature.

The system of the present invention enjoys many important technical advantages. A system constructed according to the teachings of the present invention allows people to send messages to a wireless receiver device without worrying about how to abbreviate words in the message. Instead, the owner of the wireless receiver device can define a custom dictionary associated with his wireless receiver device so that certain words appearing in messages to that user are always condensed into the same abbreviation. The user of the wireless receiver device will be familiar with the meaning of his abbreviations. Translation thus allows a maximum amount of information to be sent to the wireless receiver device user using a minimum number of letters, numbers, and/or symbols. The user can even cause common words such as the articles "the," "a," or "an" to be deleted from the message. The present invention thus allows a wireless receiver device user to receive condensed messages sent by electronic mail or any other method of sending textual messages.

According to an alternate embodiment of the present invention, the system can be used for purposes other than condensing messages. For example, a wireless receiver device user may often receive messages in different languages. The user could define a custom dictionary to translate certain words from these foreign languages into the native language of the wireless receiver device user. In addition, for security purposes, the wireless receiver device user may desire certain words to be transmitted in coded form. The present invention would allow the wireless receiver device user to define a custom dictionary to translate certain words into a secret code.

BRIEF DESCRIPTION OF THE DRAWINGS

For a more complete understanding of the present invention and its advantages, reference is now made to the following description taken in conjunction with the accompanying drawings in which.

DETAILED DESCRIPTION OF THE INVENTION

Figure 1:
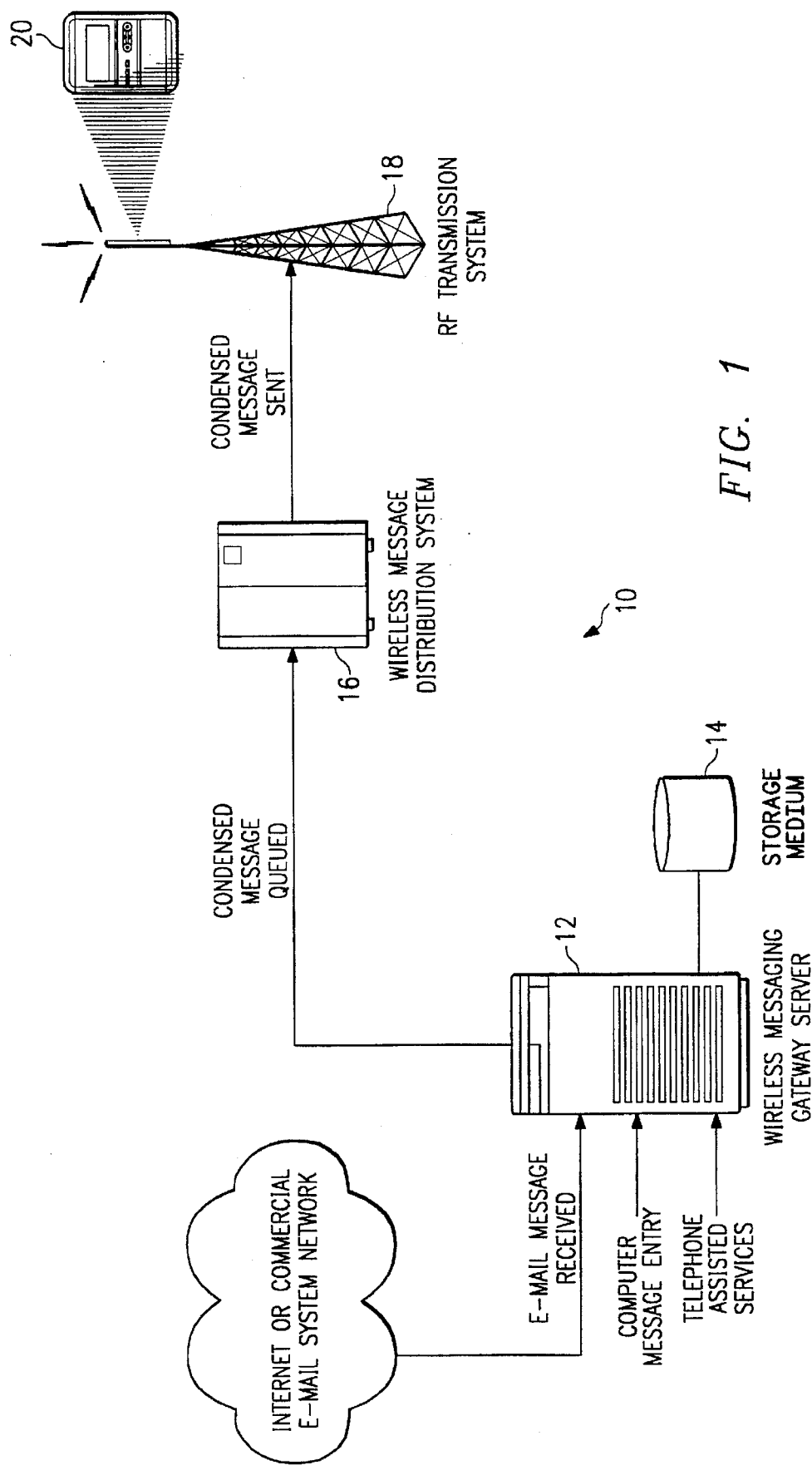
FIG. 1 illustrates a wireless receiver device message translation system constructed in accordance with the teachings of the present invention.
Figure 2:
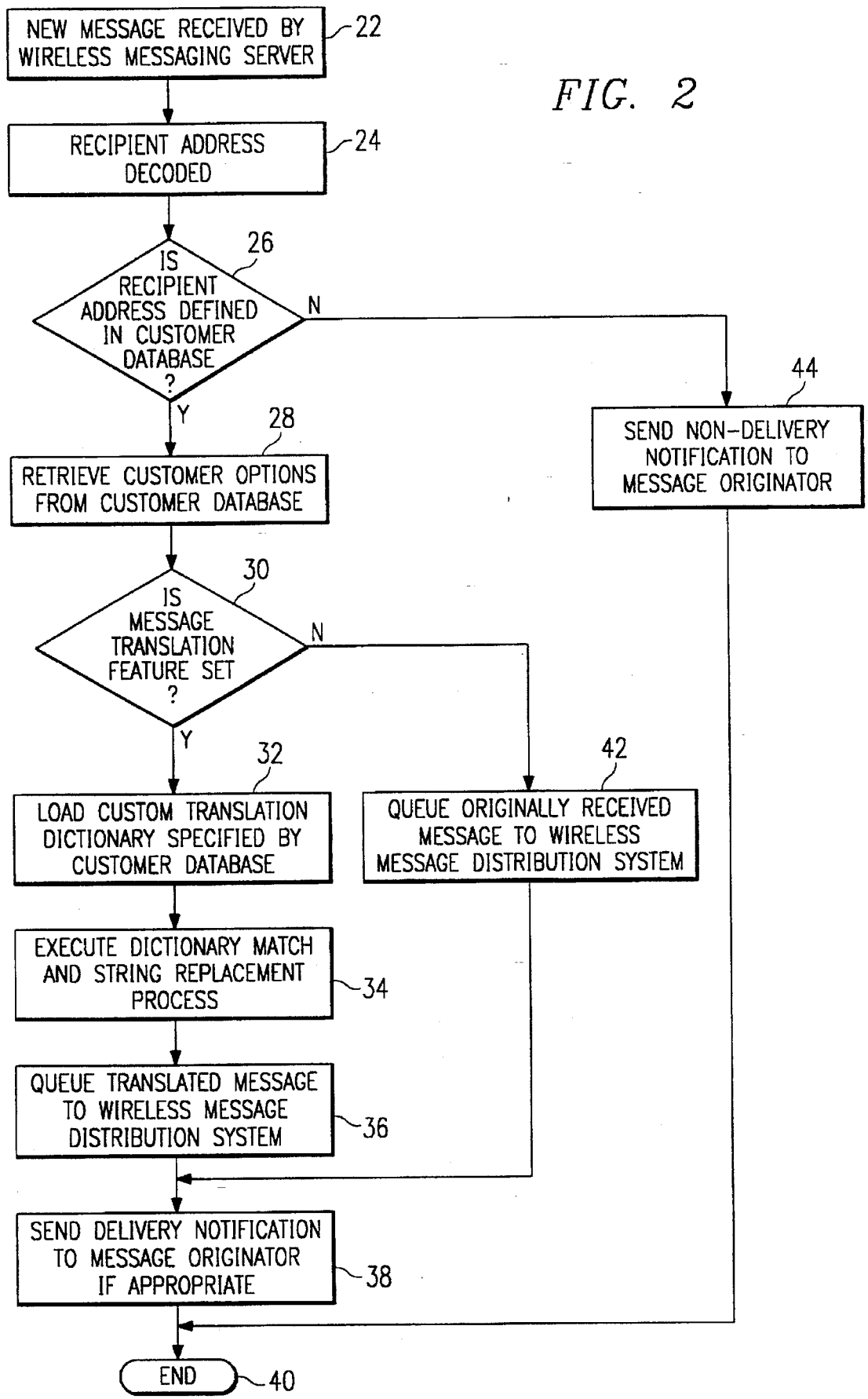
FIG. 2 illustrates a flowchart for a method of translating messages in accordance with the teachings of the present invention.
Figure 3:
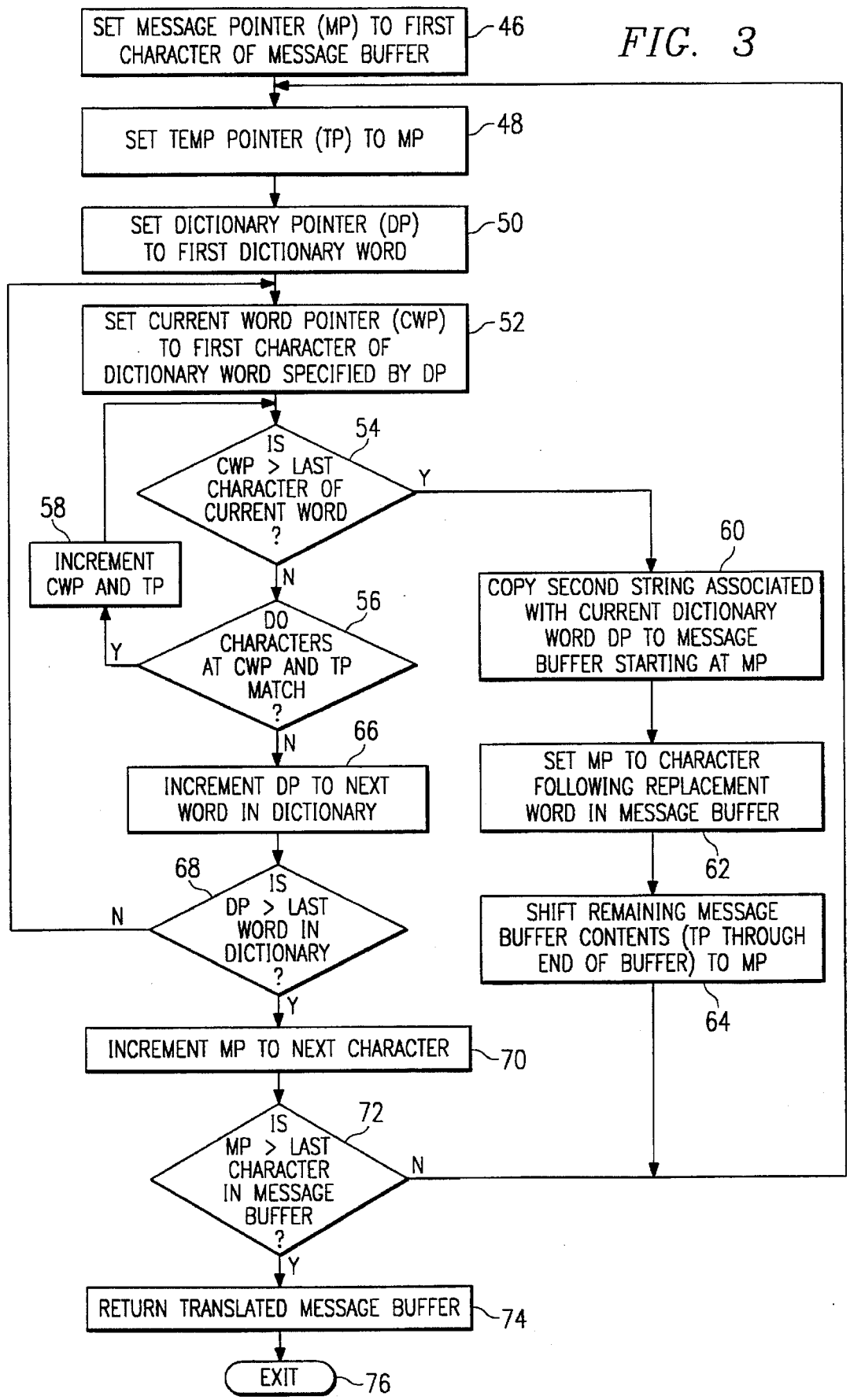
FIG. 3 illustrates a flowchart detailing the steps by which a message may be translated in accordance with teachings of the present invention.

The preferred embodiment of the present invention and its advantages are best understood by reference to FIGS. 1 through 3 of the drawings, like numerals being used for like and corresponding parts of the various drawings.

FIG. 1 illustrates a wireless messaging system indicated generally at 10 constructed in accordance with teachings of the present invention. Wireless messaging system 10 comprises wireless messaging server 12, storage medium 14, wireless message distribution terminal 16, and a radio frequency (RF) transmission system 18. Wireless messaging system 10 communicates with one or more wireless receiver devices 20.

Wireless messaging server 12 connects to one or more sources of textual messages. For example, wireless messaging server 12 may receive electronic mail messages from sources such as the Internet or a commercial electronic mail system network such as MCI Mail or cc:Mail. Wireless messaging server 12 can also receive messages from a computer message entry terminal coupled to server 12. Similarly, server 12 can receive textual messages from a telephone assisted services operator. Such an operator communicates via telephone with people desiring to send messages and the operator then types those messages into a computer message entry terminal. It should be understood that the source of messages shown in FIG. 1 are purely exemplary and that server 12 can receive textual messages from other sources without departing from the teachings of the present invention.

Wireless messaging server 12 connects to storage medium 14. Also, wireless messaging server 12 connects through a communications link to wireless message distribution system 16. Wireless messaging distribution terminal 16 connects to transmission system 18.

Wireless messaging server 12 may comprise a computer such as a UNIX or MS-DOS based personal computer. Wireless messaging server 12 may comprise a computer such as a personal computer or mini-computer together with operating system software and messaging switching software. According to one embodiment, wireless messaging server 12 comprises a Hewlett-Packard 9000 mini-computer operating the HP-UX operating system and hosting Worldtalk electronic mail switching software with a gateway module for sending and receiving messages to/from wireless distribution system 16. Storage medium 14 may be any type of storage medium such as a disk drive, a tape drive, an optical storage device, or memory. According to one embodiment of the invention, wireless message distribution terminal 16 may also comprise a suitable mini-computer running the UNIX operating system. Wireless messaging distribution system 16 may comprise a specialized computer or computers designed to maintain subscriber distribution options to accept message data from various communication sources and transmit that message in the appropriate form to radio towers 18 where the message is transmitted to wireless receiver devices.

According to one embodiment of the invention, wireless message distribution terminal 16 may comprise a Glenayre ES paging terminal or a Teknow PhenX paging terminal system. For purposes of the present invention, however, wireless message distribution terminal 16 may comprise any distribution system capable of sending textual messages to antenna 18. In addition, the functions performed by wireless messaging server 12 and wireless message distribution system 16 may be performed by a single computer equipped with appropriate communications hardware.

In operation, wireless messaging server 12 receives textual messages from external sources. These messages may then be stored in memory in wireless messaging server 12 or on storage medium 14. In this embodiment, storage medium 14 contains a plurality of user-defined dictionaries. Wireless messaging server 12 translates the input message into an output message using the appropriate user-defined dictionary.

Each dictionary comprises a series of dictionary entries. A dictionary entry has two character strings associated with it. The first string is a series of characters that may be contained in a message intended for the wireless receiver device associated with the dictionary. The second string is a series of characters to be sent to the wireless receiver device in place of the first string. For example, when the string "John Doe" is included in a source message to be sent to the wireless receiver device, the abbreviation "JD" could be sent in its place. In this example, the first string of a dictionary entry would be "John Doe" while the second string would be "JD". The second string could be a null string. For example, a user may desire the articles "a", "an", and "the" to be deleted entirely from a message to aid in condensing the message. In this situation, the first string would comprise "a", "an" or "the" and the second string would be a space. Each of the articles is preceded and followed by a space and the space can also be matched by a delimiter such as a period or comma. During translation, any first string dictionary entry found in the input message is replaced in the output message by the second string corresponding to that entry.

Wireless message distribution system 16 receives translated messages from wireless messaging server 12 and queues those messages for transmission using RF transmission system 18. Each message is then sent using RF transmission system 18. Wireless message distribution terminal 16 may also receive messages for transmission from multiple wireless messaging servers 12. The messages sent over RF transmission system 18 is then received by the intended wireless receiver device 20.

FIG. 2 illustrates a flowchart of a software program that may be run on wireless messaging server 12 to perform the translation function of the present invention. The flowchart illustrated in FIG. 2 is only one example of a software program that could be used to implement the present invention. All data required by this program may be stored in memory in wireless messaging server 12 or in storage medium 14.

The procedure begins at step 22 when a new message is received by wireless messaging server 12. Upon receipt of the new message, the message is decoded and the recipient address is determined in step 24. The recipient address refers to the data identifying the specific wireless receiver device for which the message is intended. Next, in step 26, server 12 determines whether the recipient address is contained in the customer database. In this embodiment, the customer database comprises a recipient address, a customer dictionary, a translation flag and other information associated with the specific customer. The customer database is stored on storage medium 14.

If the recipient address is contained in the customer database, then in step 28, customer option information is retrieved from the customer database. After the customer options associated with the recipient address have been retrieved, server 12 next determines in step 30 whether the customer's message translation flag is set indicating that the customer desires the message translation process. If the message translation flag is set, the user's custom translation dictionary is loaded into wireless messaging server 12 in step 32. The method then proceeds to step 34 where wireless messaging server 12 executes a dictionary match and string replacement process. One embodiment of a dictionary match and string replacement process will be described below in connection with FIG. 3. This process replaces specific strings in the input message with a corresponding translation string from the user's custom translation dictionary. After the message has been translated, the translated message may then be queued to wireless message distribution terminal 16. If appropriate, notification that the message has been delivered will then be sent to the message originator in step 38.

Returning to step 30, if the user has disabled the message translation feature the method proceeds to step 42 where the originally received message is queued to wireless message distribution terminal 16. The method proceeds from step 42 to step 38 where the server 12 sends a notification that the message has been delivered to the message originator if such notification is appropriate. Following step 38, the procedure terminates at step 40.

Returning to step 26, if the recipient address was not found in the customer database, the method proceeds to step 44 where the wireless messaging server 12 notifies the message originator that the message was not delivered. The procedure then terminates at step 40.

FIG. 3 illustrates a flowchart of a software procedure that can be used in step 34 of the process discussed with reference to FIG. 2 to translate the received message using the user's custom translation dictionary. This procedure begins at step 46 by setting a message pointer to the first character of a buffer containing the received message. The method then proceeds to step 48 where a temporary pointer is set to the value of the message pointer. Next, in step 50, a dictionary pointer is set to the first dictionary word in the user's custom translation dictionary. Then, in step 52, a current word pointer is initialized to point to the first character of the dictionary word specified by the dictionary pointer. The first dictionary word refers to the first string contained in the first dictionary entry. As discussed above, each dictionary entry contains a first string and a second string wherein the first string represents a word to be translated, and the second string represents the replacement for first string.

After all of the appropriate pointers have been initialized in steps 46 to 52, a decision is then made in step 54 whether the current word pointer is now greater than the last character of the current dictionary word. If not, then in step 56 it is determined whether the character being pointed to by the current word pointer matches the character being pointed to by the temporary pointer. If so, then both the current word pointer and the temporary word pointer are incremented in step 58. After step 58, execution returns to step 54.

If, in step 54, it is determined that the current word pointer has now been incremented beyond the end of the current dictionary word, then a match has been found. When a match is found, execution proceeds to step 60 where the second string associated with the current dictionary word being pointed to by the dictionary is copied into the message buffer starting at the location being pointed to by the message pointer. Then, in step 62, the message pointer is set to the character following the replacement word in the message buffer. Next, in step 64, the remaining contents of the message buffer are shifted and concatenated with the portion of the message that has already been processed. Following step 54, execution continues at step 48 when the temporary pointer is set to the next word.

Returning to step 56, if the characters being pointed to by the current word pointer and the temporary pointer do not match, the method proceeds to step 66 where the dictionary pointer is incremented to the next word in the dictionary. In step 68, it is then determined whether the dictionary pointer is now greater than the last word in the dictionary. If not, then execution returns to step 52. If so, then the message pointer is incremented to the next character in step 70.

Execution then proceeds to step 72 where it is determined whether the message pointer now exceeds the location of the last character in the message buffer. If not, then execution returns to step 48. If so, then execution continues to step 74 where the translated message buffer is returned as message translation is now complete. The procedure then terminates in step 76.

The present invention thus allows efficient use of a wireless transmission system by allowing the use of predetermined abbreviations to reduce the length of messages without altering their substantive content. The invention translates electronic mail messages intended for a wireless receiver device according to a user's custom-defined translation dictionary. The invention may be used to condense messages such that the user can receive a greater amount of information using a lesser number of letters, numbers, and/or symbols. For example, users may use the present invention to condense commonly encountered names of co-workers into those co-workers' initials, to eliminate unnecessary words such as articles, or to provide other short-hand versions of words such as "hm" for "home", "wk" for "work" or "off" for office.

The present invention can also be used to translate certain words into secret code words that would only have meaning to individuals who are aware of the code. The invention could also be used to translate words from a foreign language into the native language of the wireless receiver device user.

The present invention has been described in the context of two example software procedures. Other software procedures could be used without departing from the scope and teachings of the present invention. Many data processing techniques exist that could be used to perform the custom-dictionary translation for example.

Although the present invention has been described in detail, it should be understood that various changes, substitutions and alterations can be made herein without departing from the spirit and the scope of the invention as defined in the following claims.

What is claimed is:

1. A method for controlling message delivery to a first wireless receiver device among a plurality of wireless receiver devices, comprising the steps of:

receiving a first message at a wireless messaging gateway server addressed to the first wireless receiver device;

determining a recipient address of the first message at the wireless messaging gateway server;

associating the first message addressed to the first wireless receiver device to a predefined dictionary selected from a plurality of predefined dictionaries corresponding to the plurality of wireless receiver devices;

translating the first message at the wireless messaging gateway server into a second message using a predefined dictionary associated with the first wireless receiver device if the recipient address is contained in a customer database; and sending the second message to a wireless message distribution terminal if the recipient address is contained in the customer database.

2. The method of claim 1 and further comprising the steps of:

sending a nondelivery notification if the first recipient address is not contained in the customer database.

3. The method of claim 1 and further comprising the steps of:

suppressing the step of translating unless a flag associated with the first wireless receiver device is set so as to enable translation.

4. The method of claim 3 and further comprising the steps of:

sending the first message to a wireless message distribution terminal if the translating step was suppressed and if the recipient address is contained in the customer database.

5. The method of claim 1 and further comprising the step of:

sending a delivery notification to the sender of the first message if the recipient address is contained in the customer database.

6. The method of claim 1 wherein the step of translating comprises the step of translating the first message into second message using a dictionary comprising dictionary entries, each of the dictionary entries comprising a first character string that may be found in the first message and a second character string comprising a user-defined abbreviation for the character string, the second message comprising a message containing at least one of the second character strings in place of the first character strings found in the first message.

7. A method for communicating with a wireless receiver device comprising:

receiving a first message addressed to the wireless receiver device having a recipient address that is contained in a customer database at a wireless messaging gateway server;

storing the first message on a storage medium, the storage medium being coupled to the wireless messaging gateway server;

translating the first message into a second message using a predefined dictionary associated with the wireless receiver device; and sending the second message to the wireless receiver device.

8. The method of claim 7 wherein the second message comprises a condensed version of the first message.

9. The method of claim 7 wherein the second message contains at least one word that was translated into a new language from at least one word in the first message.

10. The method of claim 7, wherein the second message contains a code for at least one series of alphanumeric characters in the first message.

11. The method of claim 7, wherein the sending step further comprises:

sending the second message to a wireless message distribution terminal;

transmitting the second message from the wireless message distribution terminal to the wireless receiver device using a radio frequency transmission system.

12. A wireless receiver device message translation system, comprising:

a storage medium containing a plurality of dictionaries, at least one of the plurality of dictionaries associated with at least one of a plurality of wireless receivers; and a wireless messaging gateway server containing a customer database, the server being coupled to the storage medium and operable to receive an input message addressed to a target wireless receiver, the wireless messaging gateway server further operable to translate the input message into an output message using one of the plurality of dictionaries associated with the target receiver.

13. The wireless receiver device message translation system of claim 12, further comprising:

a transmission circuit coupled to the processor and operable to transmit the output message to the target wireless receiver.

14. The wireless receiver device message translation system of claim 13, further comprising: a wireless message distribution terminal coupled to the processor and operable to receive the output message and transmit the output message to the target wireless receiver.

15. The wireless receiver device message translation system of claim 14, further comprising:

a radio frequency transmission system coupled to the wireless message distribution terminal operable to transmit the output message to the target wireless receiver.

\* \* \* \* \*